United States Patent [19]
Chia

[11] Patent Number: 5,396,253
[45] Date of Patent: Mar. 7, 1995

[54] SPEED ESTIMATION
[75] Inventor: Si T. S. Chia, Ipswich, England
[73] Assignee: British Telecommunications plc, London, England
[21] Appl. No.: 30,205
[22] PCT Filed: Jul. 25, 1991
[86] PCT No.: PCT/GB91/01241
 § 371 Date: Mar. 22, 1993
 § 102(e) Date: Mar. 22, 1993
[87] PCT Pub. No.: WO92/01950
 PCT Pub. Date: Feb. 6, 1992
[30] Foreign Application Priority Data
 Jul. 25, 1990 [GB] United Kingdom ............... 9016341
[51] Int. Cl.6 ............................................ G01S 13/08
[52] U.S. Cl. .................................... 342/104; 379/59
[58] Field of Search .......... 342/104, 105, 115, 385, 342/386, 457, 461; 379/59, 60

[56] References Cited
U.S. PATENT DOCUMENTS

| 2,083,945 | 6/1937 | Evans | 342/461 |
|---|---|---|---|
| 3,157,876 | 11/1965 | Dickey, Jr. | 342/461 |
| 3,605,095 | 9/1971 | Higgins | 342/461 |
| 3,653,049 | 3/1972 | Thayer et al. | |
| 3,906,503 | 9/1975 | Stephens | |
| 4,502,052 | 2/1985 | Colby, Jr. | 343/458 |
| 5,055,849 | 10/1991 | Andersson et al. | 342/104 |

FOREIGN PATENT DOCUMENTS 2849282 5/1980 Germany .
3215479A 8/1988 Germany .

Primary Examiner—Mark Hellner
Attorney, Agent, or Firm—Nixon & Vanderhye

[57] ABSTRACT

A system and method of speed estimation for a cellular radio network includes a number of speed estimation units. Each unit comprises an averaging window of a different duration, a buffer store and variance calculator. The duration of each window is equivalent to the time taken by a mobile unit to traverse a distance of 20 wavelengths of the received signal at a particular speed. An incoming signal is applied to the units. The duration of the window determines the significance of the fast fade components in the signal which is related to mobile unit speed. When the average of a window is substantially constant, the speed corresponding to that window can be assumed to be achieved or exceeded. Decision logic is arranged to poll the outputs of the variance calculators to derive a speed estimation indication.

25 Claims, 2 Drawing Sheets

SPEED ESTIMATION

BACKGROUND OF THE INVENTION

1. Field of the Invention

This invention relates to a system for estimating the speed of a body remotely. The invention is particularly applicable to the estimation of speed of a mobile unit in a mobile communications, e.g. cellular radio, system.

2. Related Art

Methods of effecting handover of a call to or from a mobile unit between cells in a cellular radio telephone system are very important to the overall efficiency and quality of the service provided. The object is to achieve a fast and reliable handover between cells.

In particular, busy areas having a high call density can comprise a large macrocell, covering a number of streets extending for one or two kilometers in all directions, and a number of overlaid microcells which are located in streets where a particularly heavy call density is expected. These microcells are typically about 200 meters long and may extend simply along a straight street.

The handover between a microcell and a macrocell is subject to special considerations. It is important for the system to be able to determine whether it is worthwhile effecting a handover of a mobile unit from a macrocell to a microcell as the latter is approached. It may be that the unit is going to enter the microcell for a significant period or only relatively momentarily as the microcell is crossed.

An important factor is the determination of the mobile unit speed. If the mobile unit is stationary and experiences bad reception, only intracell handover is required. An assignment of a different channel with less interference or fading within the same base station can easily improve the quality of the link. By contrast, if the mobile unit is moving, a decision has to be made on whether an intercell or an intracell handover has to be initiated. Furthermore, as handportable mobile telephones are anticipated to be more widely used in future, they may move slowly or stay within a locality for a long time. However, there is also a chance that the handportable mobile unit is being used on a vehicle.

The assessment of vehicle speed can be carried out simply by measuring directly through, for example, the transmission of a motor vehicle. However this is unsuited to cellular radio applications.

As an alternative, the vehicle speed may be estimated by monitoring the Doppler shift of a carrier frequency. This method requires a stable frequency standard which is expensive and also impracticable if the frequency generator is to be included in each hand portable unit.

Another alternative is to use the elapsed time between two or more successful handovers. A user moving at walking pace would have a significantly longer elapsed time between handovers than when the person is travelling in a vehicle. This method, while feasible when operating on its own, has the disadvantage of requiring a relatively long training time delay of at least two or more handovers. It cannot adapt to sudden changes of speed, such as when a user alights or boards a vehicle in between handovers. Furthermore, it cannot be used immediately after the user joins the system. Consequently, it can only be used as a backup speed estimator.

SUMMARY OF THE INVENTION

It is an object of the present invention to provide a method of deriving a speed estimation that can be used in a cellular radio network.

According to the present invention there is provided a system for estimating the speed of a body comprising a speed estimation unit (14-20) having:

a) means for receiving a signal strength indication of a signal, having periodic spatial variations in signal strength, broadcast from a stationary point relative to which the speed is to be estimated; and b) means (24) for producing an indication of variation in received signal strength over a predetermined period, the indication being representative of the nature of the speed of the body during the said predetermined period.

Also according to the invention there is provided a method of speed estimation of a body comprising:

a) receiving a signal, having periodic spatial variations in signal strength, broadcast from a stationary point relative to which the speed of the body is to be estimated;

b) producing an indication of the received signal strength over a predetermined period; and c) estimating the speed from the nature of variation of the amplitude of the received signal strengths over the said predetermined period.

The invention also extends to a base station for a cellular radio system having at least one speed estimation unit as defined in the claims.

When a handportable mobile telephone unit is being used by a pedestrian, it is susceptible both to slow and fast fading because of his slow progress. When the same unit is used in a vehicle travelling at speed it is then largely only susceptible to slow fading as the fast fading lasts for a greatly reduced period resulting from the vehicle speed. Thus, the effect of fast fading as a phenomenon is greatly reduced when the unit is travelling at speed.

In a mobile radio environment, the fast fading of the received signal may be as deep as 20 to 30 dB. Likewise, the signal level drop in a microcell when negotiating a street corner is typically 20 dB. If a slow moving mobile unit encounters a deep fade, only an intracell handover is required or even no action is needed as the degradation may only be temporary. However, if the mobile unit is negotiating a corner (although, the rate of the signal drop is spatially lower than a fast fade, to a relatively fast moving mobile unit, the time taken is almost the same), an intercell or even a microcell to macrocell handover may be required.

The present invention may use time windows as filters during each of which the signal strength is monitored. Each window is of a different duration. The windows differentiate the fading rate of the signal transmitted or received at different speeds. A signal strength average in a long period window will filter out both the fast and slow fades. A relatively shorter period averaging window will not be able to filter out the slow fade as effectively. Thus, the amount of slow fade filtering will be dependent on the period of the time-averaging window.

The filtering can be performed using any suitable cumulative indication of the signal strength such as the running average, median or root mean squared (RMS) values, using a windowing function, typically a rectangular window. For a particular application the optimal window period can be determined experimentally.

Once the speed of the mobile unit has been estimated it can be used in the assessment of whether a handover is required based also on such things as signal strength and interference. One method of measuring interference is to monitor the bit error rate in a digital communication system. For example, when the mobile unit is travelling at speed, the interference due to any fading will be a much briefer phenomenon than when the same mobile unit is moving more slowly. Thus, the frequency with which the interference level is assessed can be related to the mobile unit speed, because the faster the speed the less significant will be the transient interference due to fading.

The use of a long term averaging window can also be applied to an assessment of the heading of the mobile unit relative to the microcell base station. The running average / median / rms values can be used to estimate whether the mobile unit is heading towards or away from the base station by applying linear regression to the running average to determine its slope. If the average is declining, the slope will be negative and the mobile unit can be determined to be moving away from the base station. Similarly, the heading towards the base station will result in a positive slope of the running average of received signal strength.

At least part of the linear regression calculation can be stored in a look-up table as the sampling interval on which the averages are based is conveniently regular. Thus, only real-time calculation of the variable related to the average strength signal part of the linear regression has to be performed. This will assist greatly in reducing processing delays.

A handover between a macrocell and a microcell is based on hysteresis and signal level thresholds as with conventional macrocell to macrocell handover. When the mobile unit is in a macrocell overlain with microcells, it continues to monitor the signal levels of neighbouring macrocell base stations in addition to the signal levels of the surrounding microcells. This maximizes the options available to the mobile unit in the event that a handover becomes necessary.

When the mobile unit is handed over to the microcell base station, the conditions for handing over to another base station change and a new algorithm with which to address adjacent microcell base stations, in order that their signal levels can be monitored, is adopted. The set of carrier frequencies (of the current and the adjacent base stations) to be monitored is also down-loaded to the mobile unit from the base station via the currently established channel. On the basis of the specific carrier frequency and the calculated gradient of the received signal strength variations for the current and the adjacent base stations, the mobile unit can determine toward which adjacent base station it is heading and can most appropriately handover when necessary.

The mobile unit monitors intensively the adjacent microcell base stations in addition to the serving microcell base station. If the microcell is located at the boundary of a parent macrocell the signal level of the adjacent macrocell is also arranged to be monitored.

The instructions on which microcell base stations and/or macrocell base stations are monitored is dependent on the information transmitted from the current serving microcell base station to the mobile unit when a handover has been completed. The instructions on monitoring are specific to a particular base station, so that each time a microcell to microcell handover is effected a new set of monitoring instructions are required.

Thus, in one particular form the invention provides a speed estimator comprising:
(a) means for receiving a signal broadcast from a point relative to which the speed of a body is to be estimated;
(b) first filtering means for filtering out a fast fade component of the transmitted signal;
(c) second filtering means for filtering out the fast and a slow fade component of the transmitted signal; and
(d) means for comparing the filtered signals to determine the speed of the body on the basis of the comparison of the two filtered signals.

BRIEF DESCRIPTION OF THE DRAWINGS

The present invention can be put into practice in various ways one of which will now be described by way of example with reference to the accompanying drawings in which.

DETAILED DESCRIPTION OF PREFERRED EMBODIMENTS

For the purpose of handover in a cellular radio system, there are categories of mobile unit speeds which will be of interest and will need to be distinguished between. Examples of these are 1) stationary, 2) a walking pace of approximately 1 m/s, 3) a slow mobile speed of 5 m/s, and 4) a fast mobile speed in excess of 5 m/s. The method according to the invention is applicable to any set of speeds, however. Signal fadings are generally spatially dependent with fades occurring every 0.5 wavelength (similar to a standing wave pattern). For a stationary mobile unit, an infinitely long time averaging window is required to average out the fast fading signal, as a stationary mobile is spatially static and it will remain at a specific point on the standing wave pattern. Thus, if the instantaneous signal level remains relatively static, it is possible to infer that the mobile unit is stationary. A series of graphs showing the variation of the instantaneous value and the running average value is shown in FIGS. 1(a) to 1(e). The x-coordinate in each case represents time and the y-coordinate represents signal amplitude.

Figure 1A:
FIGS. 1(a) to 1(e) illustrate signal strength variations across a distance of several wavelengths for a mobile unit travelling at various speeds in a cellular radio system.
Figure 1B:
Figure 1C:
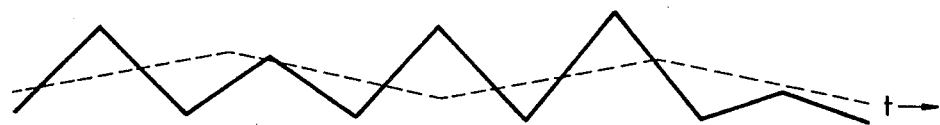
Figure 1D:
Figure 1E:

In FIG. 1(e) the solid line representing the signal level is constant, as is the average signal level represented by the dotted line. The FIGS. 1(a) to 1(d) illustrate fading patterns for decreasing speeds of mobile unit and associated averages for each, across a notional window period.

It can be noted that the variation of the average signal level for any averaging window size will be similar to the instantaneous value when the mobile unit is moving very slowly, see FIG. 1(d). As the mobile unit gradually increases speed, the similarity of the averaged signal from averaging windows will depart from the instantaneous signal levels. Of a set of windows the output of the largest averaging window (i.e. longest time frame) will be the first to depart from this trend (i.e. no longer following the instantaneous signal level) because the averaging is extended over a relatively longer distance (larger number of wavelengths). Following that, the output from the second largest averaging window will depart from the instantaneous signal level to a lesser extent and so forth.

The variation of the signal levels from the output of the averaging window depends on the distance equivalent to the number of wavelengths the mobile unit spans. However, in all cases, the variations will be smaller than the instantaneous signal level as averaging has the effect of filtering the fast varying components from the received signal. The variations will approach a steady state when the averaging is across 20 wavelength periods or more. In that situation, the average will be tracking the slow fading only (long term variation) and is substantially independent of the instantaneous signal level. When the average value becomes relatively static (and the instantaneous value is varying), we know that a steady state value has been attained, see FIG. 1(a).

At a walking pace, the time to traverse one wavelength is about 150 ms. The time to traverse 20 wavelengths (assuming the wavelength at 1.7 GHz is 0.15 m) is 3 s. Thus the window size to establish a steady average output corresponding to a speed of walking pace or above is set to 150 ms. When the mobile unit is increasing in speed, as soon as the average value from the averaging window approaches a steady state, (the steady state value is independent of the instantaneous signal level variations), we know that the specified speed of 1 m/s has been attained or exceeded. To summarise, the algorithm requires checking on the variation of the instantaneous signal level if the mobile unit is stationary. If it is not, the variance of the average signal levels is then checked. If the variance is nil or very small, i.e. a steady state is reached, we know the specified speed must either be attained or exceeded.

For any other specified speeds, it is always possible to find an averaging window having a duration corresponding to the time taken to traverse the length of 20 wavelengths of the signal frequency. The time duration of the averaging window can be calculated from the most usual speeds at which the mobile unit can be expected to travel. The following table tabulates typical averaging window sizes:

| speed (m/s) | window size (ms) |
| --- | --- |
| 0.5 | 6000 |
| 1 | 3000 |
| 5 | 600 |
| 10 | 300 |
| 30 | 100 |
| 40 | 60 |

With these averaging windows, if the instantaneous value is relatively static, the mobile unit must be stationary. If the instantaneous signal levels vary and the average value is static, the corresponding speed associated with the window duration must be attained or exceeded.

If the detection of more than one speed is implemented, the output of the other speed detection modules (higher speeds and lower speeds) can serve as confirmation of the current speed. Each stage provides the information on whether the mobile unit is above or below the specific speed, based on the variance of the average signal.

From the long-term averaging window the tendency of the signal level is useful in determining the heading of the mobile unit relative to the microcell base station. The running average produced by the speed estimator may be used to estimate the change of speed for a mobile unit. The simplest approach is to monitor the average signal levels for a sufficiently long period of time (a block of running averages) and decide the underlying trend of the values. A number of algorithms can be applied to determine the underlying trend. A simple one is to do a majority voting on all the values. If the majority of the values in the current block is larger than those in the previous block, then the underlying trend is increasing and vice-versa. An alternative method is to perform a least square fit to a block of the running averages. The least square speed estimation can be achieved by using a look-up table approach instead of real time calculations in order to minimise the processing delay. One embodiment of a speed estimator is shown in the block diagram in FIG. 2. The speed estimator accepts an input from a received signal strength indicator circuit 10.

The voltage level from the RSSI circuit is converted into a digital form in an analogue-to-digital converter 12 (ADC). The sampling rate of the ADC 12 is determined by the averaging window duration for the highest required speed. If the highest speed to be determined is 40 m/s and 100 samples are required to determine a running average, a sampling rate of 1.7 kHz is required (i.e. 100 samples per 60 ms). A rounded sampling rate of 2 kHz may be applied.

Figure 2:
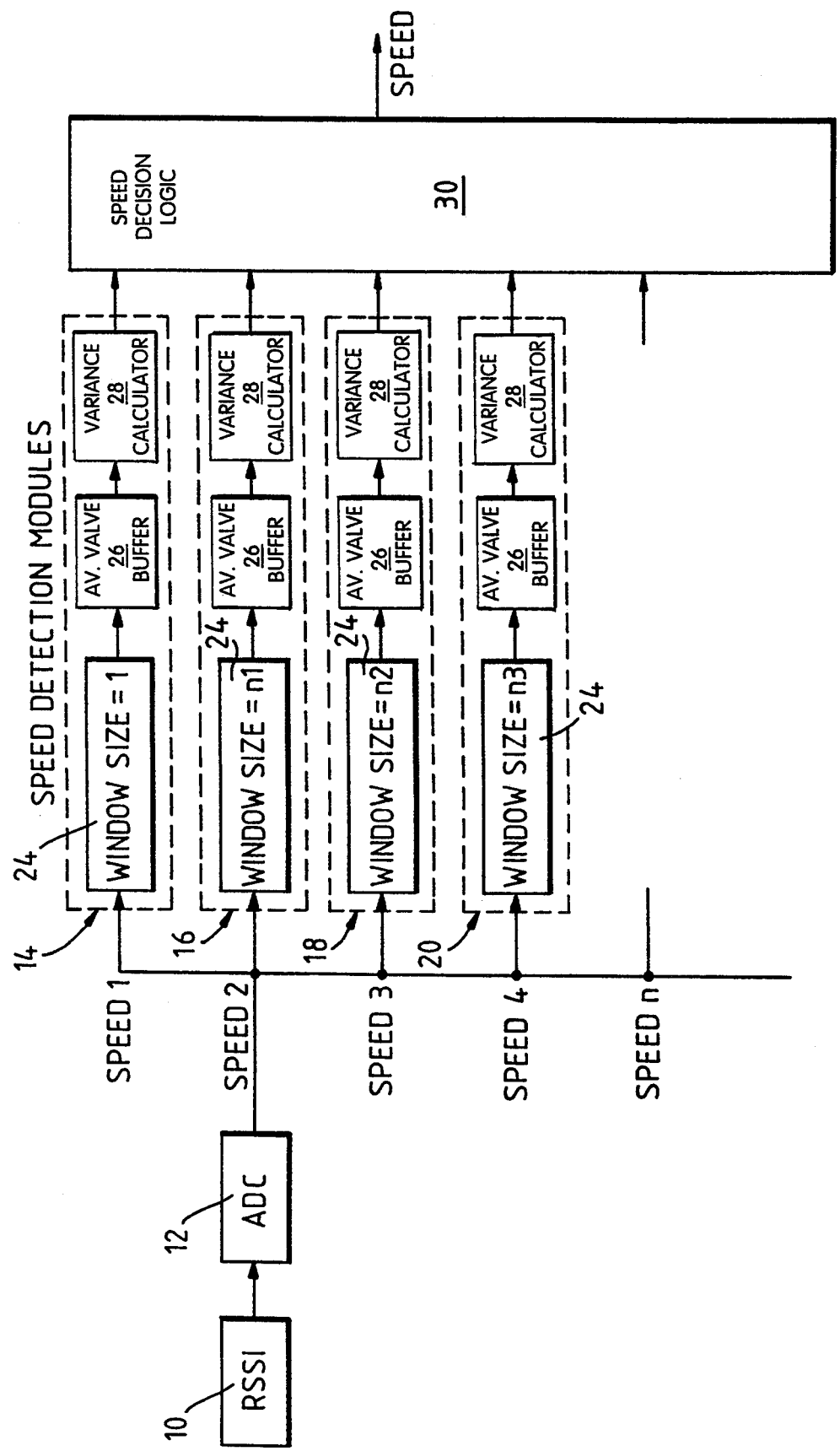
FIG. 2 is a block diagram of a speed estimator according to the present invention.

In FIG. 2, the digital data train from the ADC 12 is fed in parallel to a number of speed detection modules comprising averaging units 14 to 20 each with an averaging window of a different duration (1, n1, n2, n3 etc.). The output from each of the averaging windows is input in blocks via an average-value-buffer 26 into a variance calculator 28 before being fed to speed decision logic 30.

The averaging unit 14 with a window of 1 sample is equivalent to the instantaneous signal level. A running average can then be calculated at each block cycle where a new sampled value is fed in parallel to all the averaging units 14 to 22. The estimator will not be operational until all the averaging units and the buffers 26 are filled with samples. Thus, the time delay for the system to be operational is equivalent to the size of the largest averaging window (n3) plus the average-value-buffer size. The size of the buffer 26 is usually small, e.g. 10 samples. Thus, the majority of the time delay is with the largest averaging unit n3. For instance, if the largest averaging window n3 is for averaging over 3 s, then the system will have a time delay of approximately 3 s plus the short time to load the buffer 26.

This invention can be implemented in hardware and/or software and the number of speeds can be estimated by implementing a multiple number of basic speed detection modules.

An increment-decrement heading estimator is an extension of the speed estimator. Values stored in the average-value-buffers could be easily manipulated by software to return either a majority logic vote for the underlying trend or the slope of the least square curve fit.

To assess whether a monitored mobile unit is increasing or decreasing in speed it is possible for the values in the average value buffers 26 to be polled and manipulated by software to derive either a simple majority logic vote or the underlying trend or a more sophisticated algorithm based on, for example, a least square curve fit.

I claim:

1. A system for estimating the speed of a mobile cellular radio telephone device comprising a speed estimation unit having:
   a) means for transmitting cellular radio communications signals from a predetermined location:
   b) means for receiving a signal strength indication of a cellular radio telephone communication signal, having periodic spatial variations in signal strength, even though broadcast from a single stationary point relative to which the speed is to be estimated due to multi-path interferences; and
   c) means for producing an indication of variation in received signal strength over a predetermined time period, the indication being representative of the nature of the speed of the mobile radio telephone device during the said predetermined period and using thus derived estimated speed data in controlling inter-cell and intra-cell hand-offs of the mobile unit.

2. A system for estimating the speed of a body comprising a speed estimation unit having:
   a) means for receiving a signal strength indication of a signal, having periodic spatial variations in signal strength, broadcast from a stationary point relative to which the speed is to be estimated; and
   b) means for producing an indication of variation in received signal strength over a predetermined period, the indication being representative of the nature of the speed of the body during the said predetermined period,
   said means for producing an indication of the variation in received signal strength including accumulating means arranged to produce a cumulative indication of the received signal strength over the said predetermined period.

3. A system as in claim 2 in which the accumulating means produce an average of the received signal strength over the said period.

4. A system for estimating the speed of a body comprising a plurality of speed estimation units, each said speed unit including:
   a) means for receiving a signal strength indication of a signal, having periodic spatial variations in signal strength, broadcast from a stationary point relative to which the speed is to be estimated; and
   b) means for producing an indication of variation in received signal strength over a predetermined period, the indication being representative of the nature of the speed of the body during the said predetermined period,
   each said speed unit having means for producing an indication of the received signal strength in which the said predetermined period is of a different duration.

5. A system as in claim 4 in which each speed estimation unit further comprises a variance calculator for calculating the variance in the received signal.

6. A system as in claim 4, including decision means for estimating the speed of the body on the basis of the output of each of the speed estimating units.

7. A system for estimating the speed of a body comprising a speed estimation unit having:
   a) means for receiving a signal strength indication of a signal, having periodic spatial variations in signal strength, broadcast from a stationary point relative to which the speed is to be estimated;
   b) means for producing an indication of variation in received signal strength over a predetermined period, the indication being representative of the nature of the speed of the body during the said predetermined period, and
   c) a buffer store for storing a plurality of cumulative signal strength values produced by the means for producing an indication of the received signal strength.

8. A system as in claim 1, including an analogue to digital converter for converting the received signal strength indication into a digital signal.

9. A system for estimating the speed of a body comprising a speed estimation unit having:
   a) means for receiving a signal strength indication of a signal, having periodic spatial variations in signal strength, broadcast from a stationary point relative to which the speed is to be estimated; and
   b) means for producing an indication of variation in received signal strength over a predetermined period, the indication being representative of the nature of the speed of the body during the said predetermined period,
   wherein the predetermined period corresponds to the time taken for the body to traverse a distance equivalent to a predetermined multiple of wavelengths of the frequency of the received signal at a particular speed.

10. A system for estimating the speed of a body comprising a speed estimation unit having:
    a) means for receiving a signal strength indication of a signal, having periodic spatial variations in signal strength, broadcast from a stationary point relative to which the speed is to be estimated;
    b) means for producing an indication of variation in received signal strength over a predetermined period, the indication being representative of the nature of the speed of the body during the said predetermined period, and
    c) test means for determining whether the body is stationary.

11. A system as in claim 10 wherein the test means compares an instantaneous signal strength received at the body with the received signal strength over the said predetermined period and, if these values are substantially equal, indicates that the body is stationary.

12. A system as in claim 10 wherein the test means measures an instantaneous signal strength received at the body over a period substantially shorter than the said predetermined period and, if the instantaneous signal strength over this shorter period is substantially equal to the signal strength over the predetermined period, indicates that the body is stationary.

13. A system as in claim 10 wherein the test means measures a plurality of consecutive instantaneous signal strengths and, if these are all substantially equal, indicates that the body is stationary.

14. A method for estimating the speed of a mobile cellular radio telephone device and thus providing further information for use in controlling inter-cell and intra-cell hand-offs, said method comprising:
    a) transmitting cellular radio communication signals from a predetermined location;
    b) receiving a cellular radio telephone communication signal, having periodic spatial variations in signal strength, even though broadcast from a single stationary point relative to which the speed of the body is to be estimated due to multi-path interferences;

c) producing an indication of the received signal strength over a predetermined time period; and d) estimating the speed of the mobile radio telephone device from the nature of variation of the amplitude of the received signal strengths over the said predetermined period and using thus derived estimated speed data in controlling inter-cell and intra-cell hand-offs of the mobile unit.

15. A method for estimating the speed of a body, said method comprising:

a) receiving a signal, having periodic spatial variations in signal strength, broadcast from a stationary point relative to which the speed of the body is to be estimated;

b) producing an indication of the received signal strength over a predetermined period;

c) estimating the speed of the body from the nature of variation of the amplitude of the received signal strengths over the said predetermined period; and d) the indication of received signal strength being produced by accumulating the received signal strength over the said period.

16. A method as in claim 15 in which the accumulated signal strength is averaged.

17. A method for estimating the speed of a body, said method comprising:

a) receiving a signal, having periodic spatial variations in signal strength, broadcast from a stationary point relative to which the speed of the body is to be estimated;

b) producing an indication of the received signal strength over a predetermined period;

c) estimating the speed of the body from the nature of variation of the amplitude of the received signal strengths over the said predetermined period;

d) comparing the variance of the signal strengths received over a plurality of predetermined periods, and e) estimating the speed of the body based on the degree of variation between the received signal strength values.

18. A method as in claim 14 in which the signal strength indication is derived from a received analogue signal which is first converted into a digital signal.

19. A method for estimating the speed of a body, said method comprising:

a) receiving a signal, having periodic spatial variations in signal strength, broadcast from a stationary point relative to which the speed of the body is to be estimated;

b) producing an indication of the received signal strength over a predetermined period; and c) estimating the speed of the body from the nature of variation of the amplitude of the received signal strengths over the said predetermined period, wherein the signal strength indication is taken across a predetermined period which is the time taken to traverse a distance equivalent to a predetermined multiple of wavelengths of the frequency of the received signal at a particular speed.

20. A method for estimating the speed of a body, said method comprising:

a) receiving a signal, having periodic spatial variations in signal strength, broadcast from a stationary point relative to which the speed of the body is to be estimated;

b) producing an indication of the received signal strength over a predetermined period;

c) estimating the speed of the body from the nature of variation of the amplitude of the received signal strengths over the said predetermined period; and d) which a plurality of signal strength indications are produced, each over a predetermined period of a different duration.

21. A method in which for estimating the speed of a body, said method comprising:

a) receiving a signal, having periodic spatial variations in signal strength, broadcast from a stationary point relative to which the speed of the body is to be estimated;

b) producing an indication of the received signal strength over a predetermined period; and c) estimating the speed of the body from the nature of variation of the amplitude of the received signal strengths over the said predetermined period, wherein a test is carried out to determine if the body is stationary.

22. A method as in claim 21 in which the test comprises comparing an instantaneous signal strength indication received at the body with the received signal strength over the said predetermined period and if these values are substantially equal, indicating that the body is stationary.

23. A method as in claim 21 in which the test comprises measuring an instantaneous signal strength received at the body over a period substantially shorter than the said predetermined period and if the instantaneous signal strength over this shorter period is substantially equal to the signal strength over the predetermined period, indicating that the body is stationary.

24. A method as in claim 21 in which the test comprises measuring a plurality of consecutive instantaneous signal strengths and if these are all substantially equal, indicating that the body is stationary.

25. A speed estimator comprising:

(a) means for receiving a signal broadcast from a point relative to which the speed of a body is to be estimated;

(b) first filtering means for filtering out a fast fade component of the transmitted signal;

(c) second filtering means for filtering out the fast and a slow fade component of the transmitted signal; and (d) means for comparing the filtered signals to determine the speed of the body on the basis of the comparison of the two filtered signals.

* * * * *